(No Model.)

A. E. PRICE.
BELT TIGHTENER.

No. 536,042. Patented Mar. 19, 1895.

Witnesses
W. H. Ronsaville
S. S. Moores.

Inventor
Abraham E. Price.
By his Attorney
Herbert W. T. Jenner.

UNITED STATES PATENT OFFICE.

ABRAHAM E. PRICE, OF WAYNESBOROUGH, PENNSYLVANIA, ASSIGNOR TO THE GEISER MANUFACTURING COMPANY, OF SAME PLACE.

BELT-TIGHTENER.

SPECIFICATION forming part of Letters Patent No. 536,042, dated March 19, 1895.

Application filed December 15, 1894. Serial No. 531,904. (No model.)

*To all whom it may concern:*

Be it known that I, ABRAHAM E. PRICE, a citizen of the United States, residing at Waynesborough, in the county of Franklin and State of Pennsylvania, have invented certain new and useful Improvements in Belt-Tighteners; and I do hereby declare the following to be a full, clear, and exact description of the invention, such as will enable others skilled in the art to which it appertains to make and use the same.

This invention relates to belt tighteners; and it consists in the novel construction and combination of the parts hereinafter fully described and claimed whereby the belt is tightened automatically in proportion to its speed.

Figure 1:
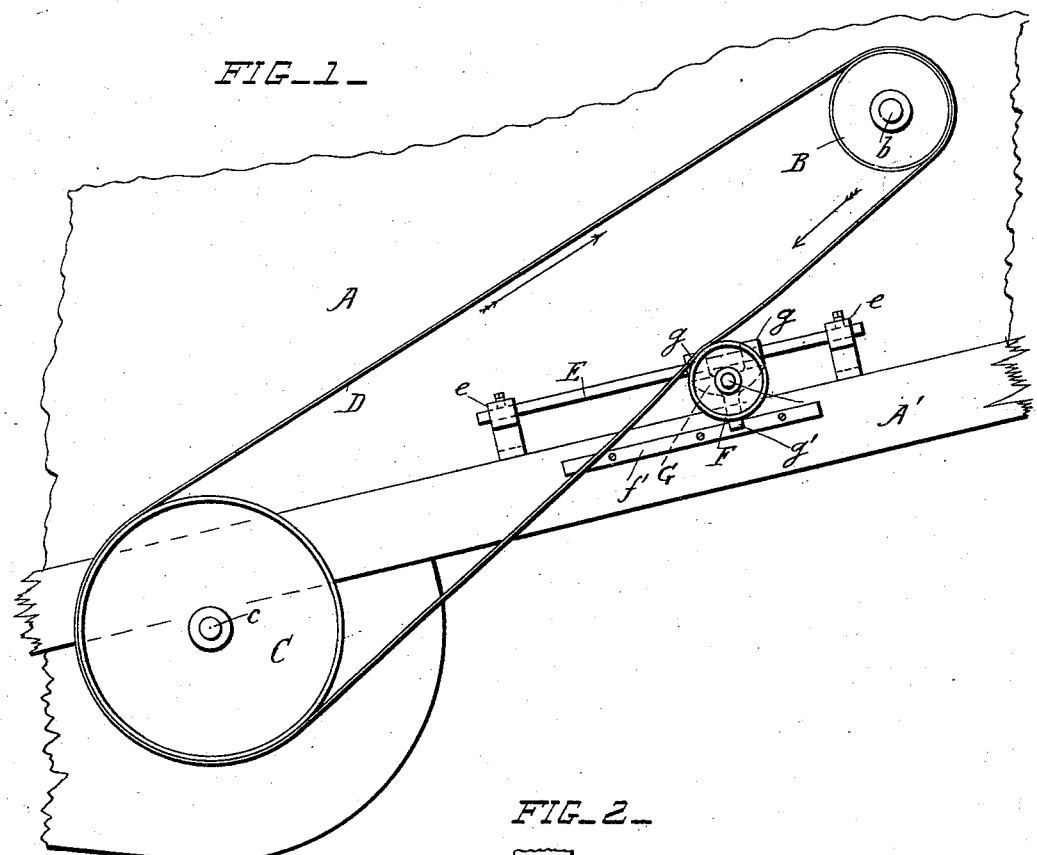
Figure 2:
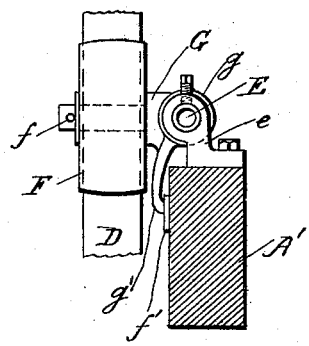

In the drawings: Figure 1 is a side view of the belt tightener showing it applied to a belt. Fig. 2 is an end view of the belt tightener.

A is a portion of the casing of a thrashing machine, and A' is one of the sills.

B is a driving pulley on the cylinder shaft b, and C is a pulley on the fan shaft c, which is driven by the belt D from the pulley B. The belt runs in the direction of the arrow.

E is a guide preferably consisting of a tube having its ends carried by the brackets e which are secured to the sill A'. The driving pulley is above and to one side of the pulley driven by it, so that the lower portion of the belt lies in a substantially inclined plane. The guide E is also inclined but at a less acute angle than the belt, and the axis of the guide is arranged to intersect the plane of the lower part of the belt at an acute angle.

F is the tightener pulley journaled on a pin f projecting from a bracket G which is provided with lugs g at its upper part arranged to slide on the guide E. The lower part of the bracket G is provided with a lug g' which bears against the sill, or against a wearing plate f' secured to the sill. The lower or slack part of the belt rests on the pulley F, and when the belt is in motion it revolves the pulley F and causes its bracket to slide down the guide, when the pulley is revolved by the belt. The tendency of the bracket to slide down the guide is restricted by the increased tension of the belt caused by the pulley F pressing against it, and the angle of the guide with respect to the belt is prearranged so that the pulley F will automatically keep the belt at its most effective tension under its ordinary speed.

When the speed of the driving pulley is increased, and the belt is in consequence more liable to slip, the increased speed of the belt causes the bracket to slide farther down the guide and thus automatically increases the tension of the belt. The tightener pulley slides longitudinally of its guide as the speed of the belt is increased or diminished, and automatically regulates the tension of the belt and keeps its tension directly proportional to its speed.

This belt tightener is shown applied to a driving belt of a thrashing machine, but it is obvious that it may be applied to any belt used on any machine.

The belt tightener may be applied to the upper part of a belt, as may be seen by inverting the drawings. It may also be applied to the inner side of a belt as well as to the outer side, but it is preferably applied to the outer side, as shown in the drawings, as it then tends to increase the lengths of the arcs of contact of the belt with the pulleys when the belt is tightened.

The axis of the guide must be inclined toward and at an acute angle to the surface of the belt against which the tightener pulley impinges, but it is immaterial whether the guide is inclined or horizontal, or in which direction it is inclined, provided the angle of the guide is not so great as to cause the pulley to slide down the guide by gravity away from the belt. It is also not desirable that the pulley should slide down the guide by gravity toward the belt, as then if the speed of the belt were increased it would automatically cause the pulley to tighten the belt too much in proportion to its increase of speed. The tightening of the belt is effected by the motion of the belt which sags upon the tightening pulley and produces the same effect upon it as if the pulley were pushed along the guide toward the belt.

What I claim is—

1. The combination, with a belt, of a belt tightener comprising a slidable pulley arranged to bear against the slack side of the belt, and a guide supporting the said pulley and having its axis inclined toward the belt at an acute angle and in the direction of its motion, whereby the said pulley is slid longitudinally of its guide by the motion of the belt as the speed of the belt increases or diminishes, and operates to increase or diminish the tension of the belt in proportion to its speed, substantially as set forth.

2. An automatic belt tightener, consisting of the stationary end brackets, the tubular guide carried by the said brackets and having its axis arranged to intersect the plane of the belt, a bracket having lugs on its upper part, said lugs G being slidable on the said guide, a lug on its lower part, and a projecting pin; a stationary wearing plate for the last said lug to bear against, and a tightener pulley journaled on the said pin and arranged to bear against the belt, substantially as set forth.

In testimony whereof I affix my signature in presence of two witnesses.

ABRAHAM E. PRICE.

Witnesses:
J. A. MIDDOWER,
ALF. N. RUSSELL.